(12) United States Patent
Nieuwejaar

(10) Patent No.: US 10,013,370 B2
(45) Date of Patent: Jul. 3, 2018

(54) METHOD AND SYSTEM FOR PROVIDING ACCESS OF A STORAGE SYSTEM USING A SHARED STORAGE MODULE AS A TRANSPORT MECHANISM

(71) Applicant: EMC Corporation, Hopkinton, MA (US)

(72) Inventor: Nils Nieuwejaar, Belmont, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 205 days.

(21) Appl. No.: 14/983,269

(22) Filed: Dec. 29, 2015

(65) Prior Publication Data

US 2017/0185543 A1  Jun. 29, 2017

(51) Int. Cl.
| | |
|---|---|
| *G06F 13/16* | (2006.01) |
| *G06F 3/06* | (2006.01) |
| *G06F 13/10* | (2006.01) |
| *G06F 13/28* | (2006.01) |
| *G06F 13/40* | (2006.01) |
| *G06F 13/42* | (2006.01) |

(52) U.S. Cl.
CPC ........ *G06F 13/1668* (2013.01); *G06F 3/0604* (2013.01); *G06F 3/065* (2013.01); *G06F 3/0673* (2013.01); *G06F 13/102* (2013.01); *G06F 13/1605* (2013.01); *G06F 13/28* (2013.01); *G06F 13/4004* (2013.01); *G06F 13/4068* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 7,631,021 | B2* | 12/2009 | Sarma | G06F 17/30578 |
| 8,554,963 | B1 | 10/2013 | Shapiro et al. | |
| 8,589,659 | B1* | 11/2013 | Shapiro | G06F 3/0641 |
| | | | | 707/827 |
| 8,924,596 | B1* | 12/2014 | Beeson | G06F 3/0659 |
| | | | | 710/18 |
| 9,003,090 | B1 | 4/2015 | Davis | |
| 2006/0282638 | A1* | 12/2006 | Oshima | G06F 3/0622 |
| | | | | 711/170 |
| 2007/0050571 | A1* | 3/2007 | Nakamura | G06F 3/0626 |
| | | | | 711/154 |
| 2007/0168610 | A1* | 7/2007 | Kobayshi | G06F 3/061 |
| | | | | 711/114 |

(Continued)

*Primary Examiner* — Elias Mamo
(74) *Attorney, Agent, or Firm* — Womble Bond Dickinson (US) LLP

(57) ABSTRACT

According to one embodiment, a first control module (CM) of a storage system receives a first request from a client device to read first data stored in a second storage location of a storage module, where the second storage location is associated with a second CM. The first CM includes a first processor and the second CM includes a second processor. The first CM transmits a first control signal the second CM via the inter-processor link to request the second CM to copy the first data from the second storage location to a first memory location associated with the first CM. The first CM initiates a first data transaction to transmit the first data from the first memory location to the client device through a communication fabric without having to go through the second CM.

27 Claims, 11 Drawing Sheets

(56) References Cited

U.S. PATENT DOCUMENTS

| | | | | |
|---|---|---|---|---|
| 2011/0283037 A1* | 11/2011 | Koga | ............... | G06F 11/201 |
| | | | | 710/313 |
| 2013/0179481 A1* | 7/2013 | Halevy | ............ | G06F 17/30094 |
| | | | | 707/827 |
| 2014/0372640 A1* | 12/2014 | Li-On | ............... | G06F 11/2221 |
| | | | | 710/74 |

\* cited by examiner

METHOD AND SYSTEM FOR PROVIDING ACCESS OF A STORAGE SYSTEM USING A SHARED STORAGE MODULE AS A TRANSPORT MECHANISM

FIELD OF THE INVENTION

Embodiments of the present invention relate generally to data storage systems. More particularly, embodiments of the invention relate to providing access to a storage system using a shared storage module as a transport layer between control modules.

BACKGROUND

The speed at which a system can write data to persistent storage and read data from persistent storage is often a critical factor in the overall performance of the system. The traditional approach of transferring data to and from a persistent storage system requires processing by multiple layers of software, firmware, and hardware on both the client system and the persistent storage system. In addition, data is typically copied as it moves between these layers. As a result, extra latency is incurred beyond the latency required to read or write the underlying physical storage medium, and this latency reduces the overall performance of the system.

In some situations multiple processors or systems are provided to clients for accessing data stored in a storage system, possibly for increased performance or for redundancy purposes. In order for two such systems to communicate, each of the systems needs to include sufficient hardware and/or software to enable the both systems to interface. Conventional methods for these two systems or processors to communicate with one another include network connections or inter-processor links that are relatively slow, or are designed for low latency rather than high bandwidth.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
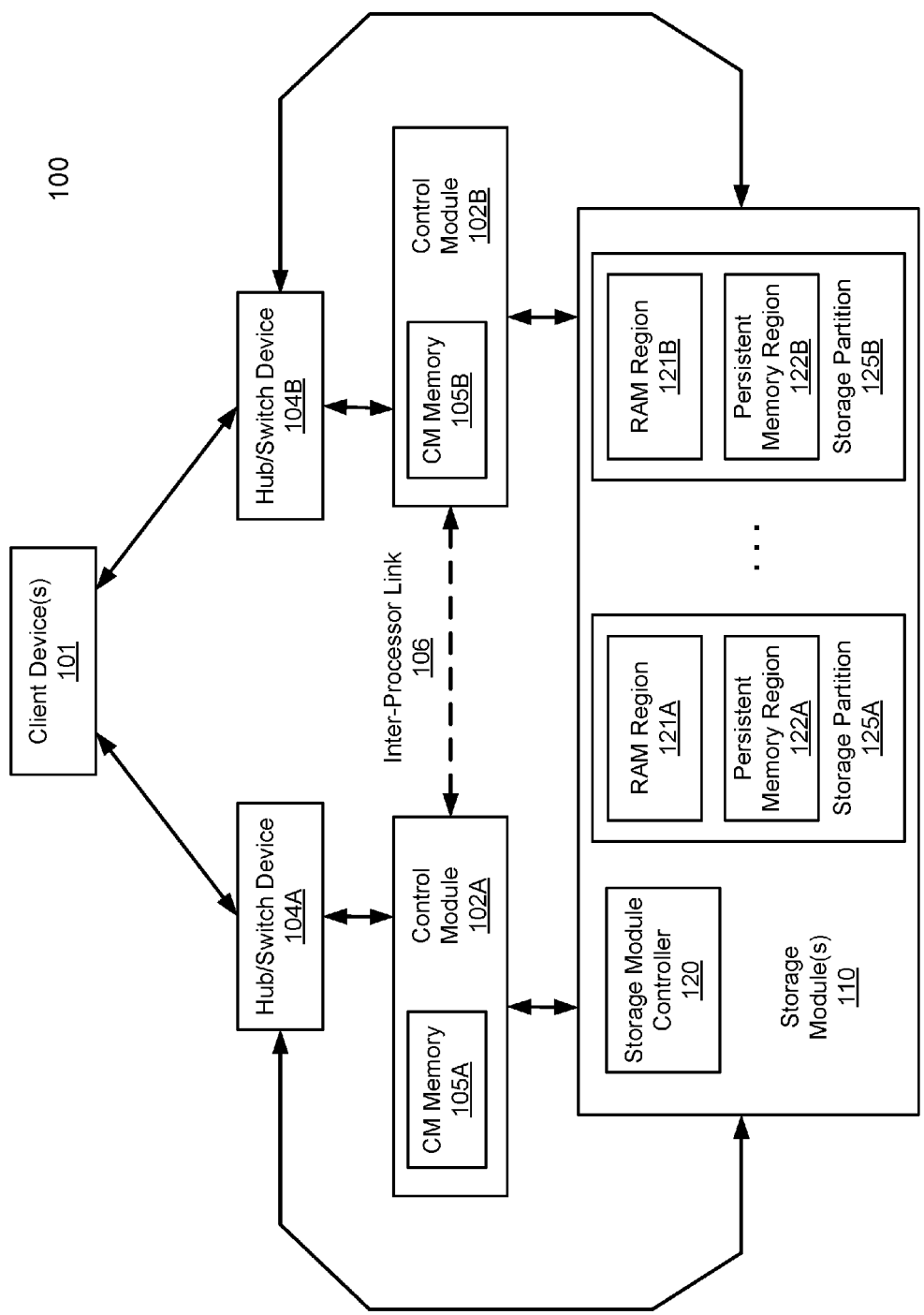
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a storage system includes one or more clients communicatively coupled or connected to one or more storage modules via a communication fabric (e.g., a high speed communication fabric). The clients access data stored in any of storage devices of the storage modules via multiple control modules, including a first control module and a second control module. The control modules are coupled to the clients and the storage modules via the communication fabric. The first control module is coupled to the second control module via an inter-processor link (also referred to as a processor interconnect), which may have a lower speed or capacity compared to the communication fabric. A client can access data stored in a storage module via the first control module (e.g., a primary path) and/or the second control module (e.g., a secondary path). When one of the paths is not available, the client can access (e.g., read, write) data via the other path using a control module associated with that path. The control modules communicate with each other via the inter-processor link to enable the data to be accessed in the storage module shared between two control modules.

In one embodiment, when a first control module (CM) receives a read request from a client device to read data from a storage location associated with a second CM, the first CM transmits a control signal to the second CM via the inter-processor link to request the data. In response to the control signal, the second CM retrieves the requested data from the storage location of a storage module and makes the requested data available in a memory region of the storage module that is accessible by the first CM. The second CM then transmits a response or acknowledgment to the control signal to the first CM via the inter-processor link indicating the requested data is available in the memory region. In response to the response or acknowledgment, the first CM retrieves the data from the memory region and returns the data to the client. In one embodiment, the first CM initiates a data transaction (e.g., direct memory access or DMA session) to move the requested data from the memory region to a client memory associated with the client device, for example, via the high speed communication fabric without having to go through the second CM. As a result, even if the path from the client device to the second CM is down, the client device can still access the data via the first CM using the shared storage module over the high speed communication fabric.

In another embodiment, when a first CM receives a write request from a client device to write data to a storage location associated with a second CM, the first CM initiates a data transaction (e.g., DMA transaction) to move the data from a client memory of the client device to a memory region of a storage module associated with the first CM, for example, over a high speed communication fabric. Alternatively, the client initiates the data transaction. The first CM then transmits a control signal to the second CM via an inter-processor link indicating that the data is available in the memory region to be written to a target storage location of a persistent storage device associated with the second CM. In response to the control signal, the second CM causes the data to be copied or moved from the memory region associated with the first CM to the target storage location of the storage module. In a particular embodiment, the data may also be copied to a memory associated with or within the second CM to allow the second CM to perform certain operations on the data, such as, for example, parity construction. Thereafter, the second CM returns a response to the first CM via the inter-processor link indicating that the data has been successfully written. As a result, even if the path from the client device to the second CM is down, the client device can still write the data via the first CM using the shared storage module over the high speed communication fabric.

FIG. 1 is a block diagram illustrating a storage system according to one embodiment of the invention. Storage system 100 may represent any storage server, such as, a cloud storage server, a content server, etc. Referring to FIG. 1, storage system 100 includes one or more client devices 101 (also simply referred to as clients) communicatively coupled to control modules 102A-102B and one or more storage modules 110 via one or more hub or switch devices 104A-104B. Although only one client 101 is shown, multiple clients can be applicable. Similarly, although only one storage module 110 is shown, multiple storage modules can also be applied and more CMs can be utilized in addition to CMs 102A-102B, dependent upon the specific configurations or requirements. Further, each of CMs 102A-102B may include a processor and a local memory such as CM memory devices 105A-105B (collectively referred to as CM memory devices 105). CM memory devices 105 may be any kinds of volatile memory devices, such as Dynamic Random-Access Memory (DRAM), Synchronous DRAM, SDR SDRAM, or DDR SDRAM. Note that a CM can be a single processor in a multi-processor system. In other configurations, a CM can be implemented as an independent server, with its own memory and local storage. CMs can be independent servers in the same or different chassis.

In one embodiment, client 101 is coupled to CMs 102A-102B and storage module 110 via a communication fabric, while CM 102A and CM 102B are coupled to each other via an inter-processor link 106 (also referred to as a processor interconnect). In this example, for the illustration purpose, the communication fabric is represented by the solid lines or connections amongst the components 101-104B and 110, while inter-processor link 106 is represented by a dash line or dash connection. Note that inter-processor link can be an interconnect, a bus, a network, or a combination thereof. The communication fabric, represented by the solid lines and hub/switch devices 104A-104B in this example, may be a full mesh communication fabric that allows each of the components 101-104B and 110 to communicate with each other and to access resources (e.g., memory, processing resources) of each other.

In one embodiment, storage system 100 may be a server or a part of a cluster of servers to provide data storage or content services to remote devices over a network (e.g., the Internet). For example, client device 101 may be a frontend server component (e.g., Web server, content server, or cloud server) coupled to a backend storage appliance represented by CMs 102A-102B and storage module 110. In such a configuration, client 101 operates as a server to provide services to remote devices over the Internet, while client 101 operates as a client to the storage appliance represented by CMs 102A-102B and storage module 110 over a communication fabric. CMs 102A-102B, also collectively referred to as CMs 102, may operate as a storage controller or server component of the storage appliance.

In one embodiment, storage system 100 may be implemented within an electronic rack. For example, client 101 may be implemented as a part of a client blade or plane inserted into a backplane representing a communication fabric (which is represented by the solid connections and hub/switch devices 104A-104B). CMs 102A-102B may be implemented as a part of one or more control blades or control planes inserted into the backplane. Storage module 110 may be implemented as a part of a storage blade (or storage plane or data plane) inserted into the backplane. Thus, all of the blades are coupled to each other via the communication fabric using various appropriate communication protocols, while CMs 102A-102B are coupled to each other via inter-processor link 106 within the control blade(s). Other configurations may exist.

In one embodiment, storage module 110 includes one or more random access memory (RAM) devices and one or more persistent storage devices (not shown), which may be controlled or managed by a storage module controller 120. The RAM devices and the persistent storage devices of storage module 110 may be logically or physically partitioned into storage partitions 125A-125B (collectively referred to as storage partitions 125). Storage partitions 125A-125B may be allocated for CMs 102A-102B, respectively. Each of the storage partitions 125A-125B includes a corresponding RAM region such as RAM regions 121A-121B (collectively referred to RAM 121). RAM devices can be any types of volatile memory devices, such as, Dynamic Random-Access Memory (DRAM), Synchronous DRAM, SDR SDRAM, or DDR SDRAM. Similarly, each of storage partitions 125A-125B includes a corresponding persistent memory or storage region such as persistent memory regions 122A-122B (collectively referred to as persistent memory regions 122). Persistent storage regions 122 can be any kinds of non-volatile storage devices, such as solid state memory devices (e.g., flash memory devices). CMs 102A-102B may communicate with storage module controller 120 over the communication fabric to access storage locations of storage partitions 125.

In one embodiment, storage module controller 120 is configured to receive requests to read from and/or write data to CMs 102A-102B. Further, storage module controller 120 is configured to service the read and write requests using storage partitions 125A-125B. In addition, storage module controller 120 may include a direct memory access (DMA) engine to move or copy data between storage partitions 125, CM memory devices 105, and a client memory of client 101 (not shown).

In one embodiment, the communication fabric can be any kind of high speed communication fabric, such as, for example, a PCIe, Ethernet, Fiber channel, or Infiniband™ fabric. Inter-processor link 106 may be an Intel QuickPath™ Interconnect or other point-to-point communication link.

Client 101 may be any system that includes functionality to issue a read request to a storage appliance and/or issue a write request to the storage appliance. Client 101 may include a client processor and client memory (not shown). In one embodiment client 101 is configured to communicate with the storage appliance (represented by control modules 102A-102B and one or more of storage module 110) using a variety of communication protocols, such as, peripheral component interconnect (PCI), PCI-Express (PCIe), PCI-eXtended (PCI-X), non-volatile memory express (NVMe), non-volatile memory express (NVMe) over a PCIe fabric, non-volatile memory express (NVMe) over an Ethernet fabric, and non-volatile memory express (NVMe) over an InfiniB and fabric.

In one embodiment, the commands and responses/acknowledgements exchanged amongst client 101, CMs 102A-102B, and storage module 110 may be exchanged via corresponding submission queues and completion queues maintained in various memories associated with these components. For example, Each of CM memories 105A-105B may contain individual or separate submission queues and completion queues for client 101 and storage module 110. Similarly, a client memory of client 101 may maintain a submission queue and a completion queue for each of CMs 102A-102B. A submission queue is used by an end point to submit a command to another end point over the communication fabric for a particular operation. A completion queue is used by an end point to place an acknowledgment or response to a command previously submitted via a submission queue to signal another end point that the command has been completed.

For example, when client 101 initiates a read request to CM 102A, client 101 would place a read request command in a submission queue associated with CM 102A maintained in memory 105A. By placing a command in the submission queue, CM 102A may be notified, for example, via an interrupt (e.g., doorbell interrupt). Similarly, when CM 102A completes a command issued from client 101, CM 102A would place an indicator (e.g., an acknowledgment, response) in a completion queue associated with client 101 to signal client 101 that the command has been executed. The completion queue associated with client 101 may be maintained in a client memory of client 101. Further information concerning client 101, CMs 102A-102B, and storage module 110, as well as the communication fabric, will be described in details further below with respect to FIGS. 5A-5D and 6-7.

In one embodiment, CM 102A may have read and write access rights or privileges to its storage partition 125A and read-only access rights or privileges to storage partition 125B. Similarly, CM 102B may have read and write access rights to storage partition 125B and read-only access rights to storage partition 125A. Alternatively, both CMs 102A-102B may have read and write access rights to all memory regions and storage regions, as long as storage module controller 120 can manage or control the access contention and/or conflicts/coherency. In another embodiment, CMs 102A-102B can directly control and manage their respective memory regions and storage regions of storage module 110. In such a configuration, storage module controller 120 may be optional.

Typically, client 101 can access data stored in a storage region associated with CM 102A via a first communication path through CM 102A Likewise, client 101 can access data stored in a storage region associated with CM 102B via a second communication path through CM 102B. Both paths may be available for client 101 simultaneously for a better bandwidth. Alternatively, one path may be a redundant path to the other path. When one path (e.g., path through CM 102B) is unavailable (e.g., failure), client 101 can go through the other path (e.g., a path through CM 102A) to read or write data from or to a storage region associated with the unavailable path. When using this alternate route, a conventional system would have to use inter-processor link 106 to transfer the data from one CM to another CM. However, inter-processor link 106 is generally slower or has less bandwidth capacity compared to the communication fabric. Since both CMs 102A-102B are coupled to storage module 110 via a high speed communication fabric, storage module 110 may be utilized as a transport path between CMs 102A-102B to allow client 101 to avoid the failed path and to use the other available path to achieve the same goal, without having to use inter-processor link 106 to carry or transport the data.

According to one embodiment, when a request is received by a first CM (e.g., CM 102A) from client 101 to read data from a storage location associated with a second CM (e.g., CM 102B), the first CM transmits a control signal via inter-processor link 106 to the second CM to request the data from the second CM. In response to the control signal, the second CM communicates with storage module controller 120 to retrieve the requested data from the storage location and to make the requested data available in a memory region associated with the first CM. The second CM sends a response via inter-processor link 106 to the first CM indicating that the requested data is available. In response to the response, the first CM initiates a data transaction (e.g., DMA session) to move the requested data to a client memory (e.g., not shown) of client 101 over the communication fabric, without having to go through the second CM and inter-processor link 106.

According to another embodiment, when a request is received by a first CM (e.g., CM 102A) from client 101 to write data to a storage location associated with a second CM (e.g., CM 102B), the first CM initiates a data transaction (e.g., DMA session) to move or copy the requested data from a client memory (e.g., not shown) of client 101 to a memory location associated with the first CM over the communication fabric. The first CM then transmits a control signal to the second CM via inter-processor link 106 indicating that the data is available at the memory location. In response to the control signal, the second CM retrieves the data from the memory location of the first CM and writes the data to the destination. Thus, inter-processor link 106 is utilized as a control path, while the communication fabric is utilized as a data path for accessing data. Note that the term of "a memory location" refers to a location within a volatile memory (e.g., RAM regions 121A-121B, CM memories 105A-105B). The term of "a storage location" refers to a location within a non-volatile or persistent memory or storage device (e.g., persistent memory regions 122A-122B).

Figure 2A:
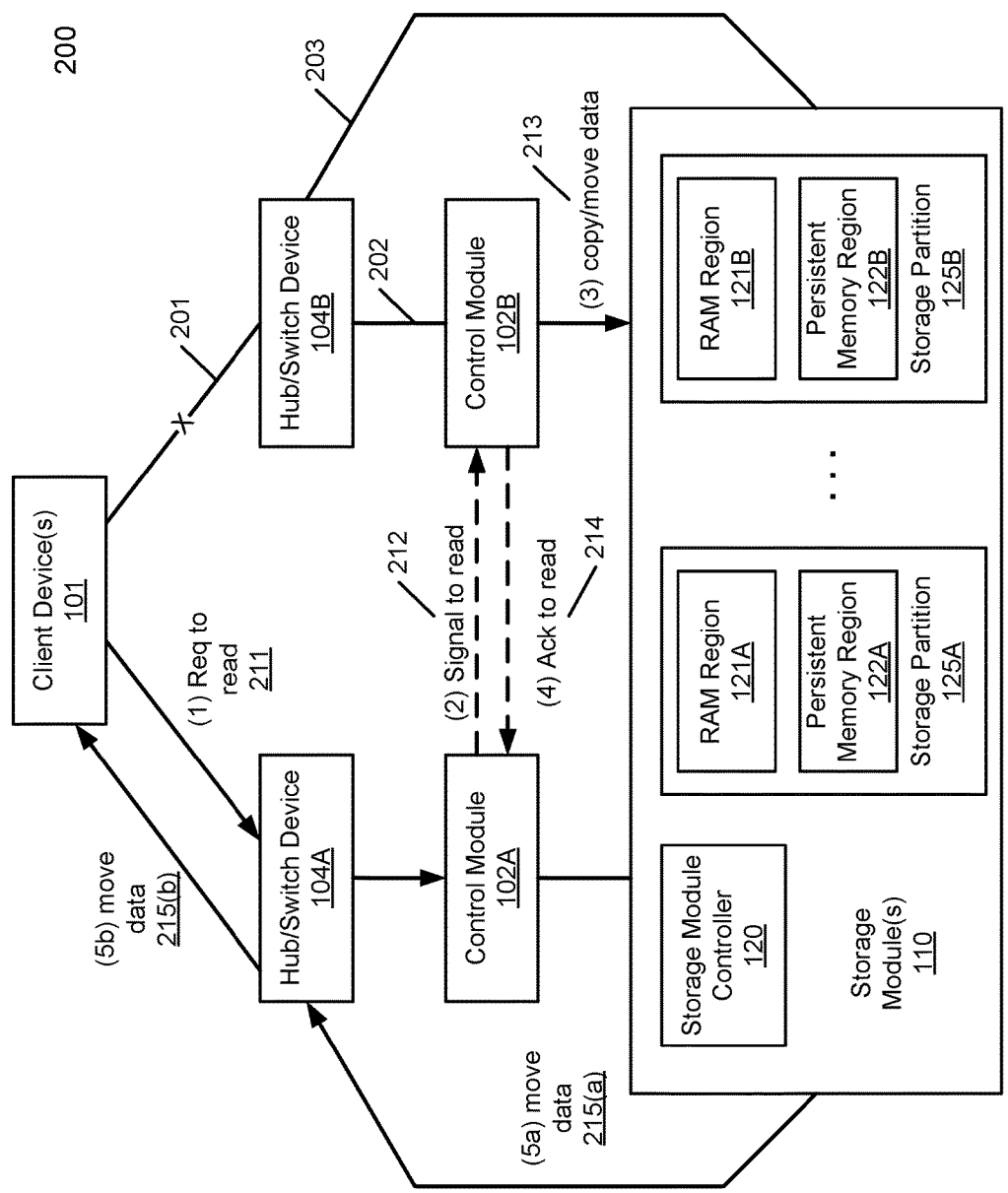
FIG. 2A is a block diagram illustrating a read process of a storage system according to one embodiment of the invention.

FIG. 2A is a block diagram illustrating a read process of a storage system according to one embodiment of the invention. Referring to FIG. 2A, system 200 may be implemented as part of system 100 of FIG. 1. In one embodiment, it is assumed the path from client 101 to CM 102B is down, which may be any of connections 201-203. In this example, client 101 transmits a read request via path 211 (which is part of the communication fabric) to CM 102A via optional hub/switch device 104A. The read request is to read data stored in a storage region of a persistent storage device of storage module 110 associated with CM 102B, in this example, storage device 122B of storage partition 125B.

In response to the read request, CM 102A transmits a control signal to CM 102B via inter-processor link represented by operation 212. The control signal may include an identifier identifying the requested data, the size of the data to be read, and/or the targeted storage location (e.g., a storage location of persistent memory region 122B). In response to the control signal, CM 102B communicates with storage module controller 120 via path 213 to retrieve the requested data from the targeted storage location from persistent storage device 122B and to place the data at a predetermined memory location of memory region 121A associated with CM 102A. The predetermined memory location may be a pre-agreed upon memory location or specified in the control signal. Once the requested data has been placed in memory region 121A, CM 102B transmits a response to the control signal to CM 102A via the inter-processor link (represented by operation 214). In response to the response, CM 102A initiates a data transaction (e.g., DMA transaction) to move or copy the data from memory region 121A to a client memory (not shown) of client 101 via paths 215(a) and 215(b) through optional hub/switch device 104A over the communication fabric.

According to another embodiment, the requested data may be copied from the targeted storage location of persistent storage device 122B associated with CM 102B to memory region 121B. CM 102B then transmits a response to CM 102A via the inter-processor link. In response, CM 102A copies or moves (e.g., via storage module controller 120) the data from memory region 121B to memory region 121A, before initiating the data transaction from memory region 121A to the client memory of client 101. In one embodiment, CM 102A may instruct storage module controller 120 to program or configure a DMA engine within storage module controller 120 (not shown). Alternatively, CM 102A may communicate with a DMA engine within hub/switch device 104A to move the data from memory region 121A to the client memory of client 101. Furthermore, CM 102A may communicate with client 101 to instruct client 101 to program or configure a DMA engine within client 101 to move the data from memory region 121A to the client memory of client 101.

According to a further embodiment, any of storage partitions 125A-125B may be configured to be accessible by any of CMs 102A-102B. CMs 102A-102B may further control and/or manage storage resources of storage module 110 without involving storage module controller 120. In such a configuration, in response to a read request, CM 102B can access a storage location in storage partition 125B that stores the requested data to cause the requested data to be available in memory region 121A or memory region 121B. For example, CM 102B can locate the requested data stored in persistent memory region 122B based on the control signal and load or copy the requested data in memory region 121A or 121B. CM 102A can then initiate a data transaction to move the data from memory region 121A or memory region 121B to the client memory of client 101. Such a configuration can eliminate the need of copying data between memory region 121B and memory region 121A.

According to another embodiment, CM 102A can reserve a predetermined memory location in RAM region 121A. In response to a control signal received from CM 102A, CM 102B retrieves the requested data from persistent memory region 122B and loads the requested data to the predetermined memory location of RAM region 121A. CM 102A then transfers the requested data from RAM region 121A to client 101.

Figure 2B:
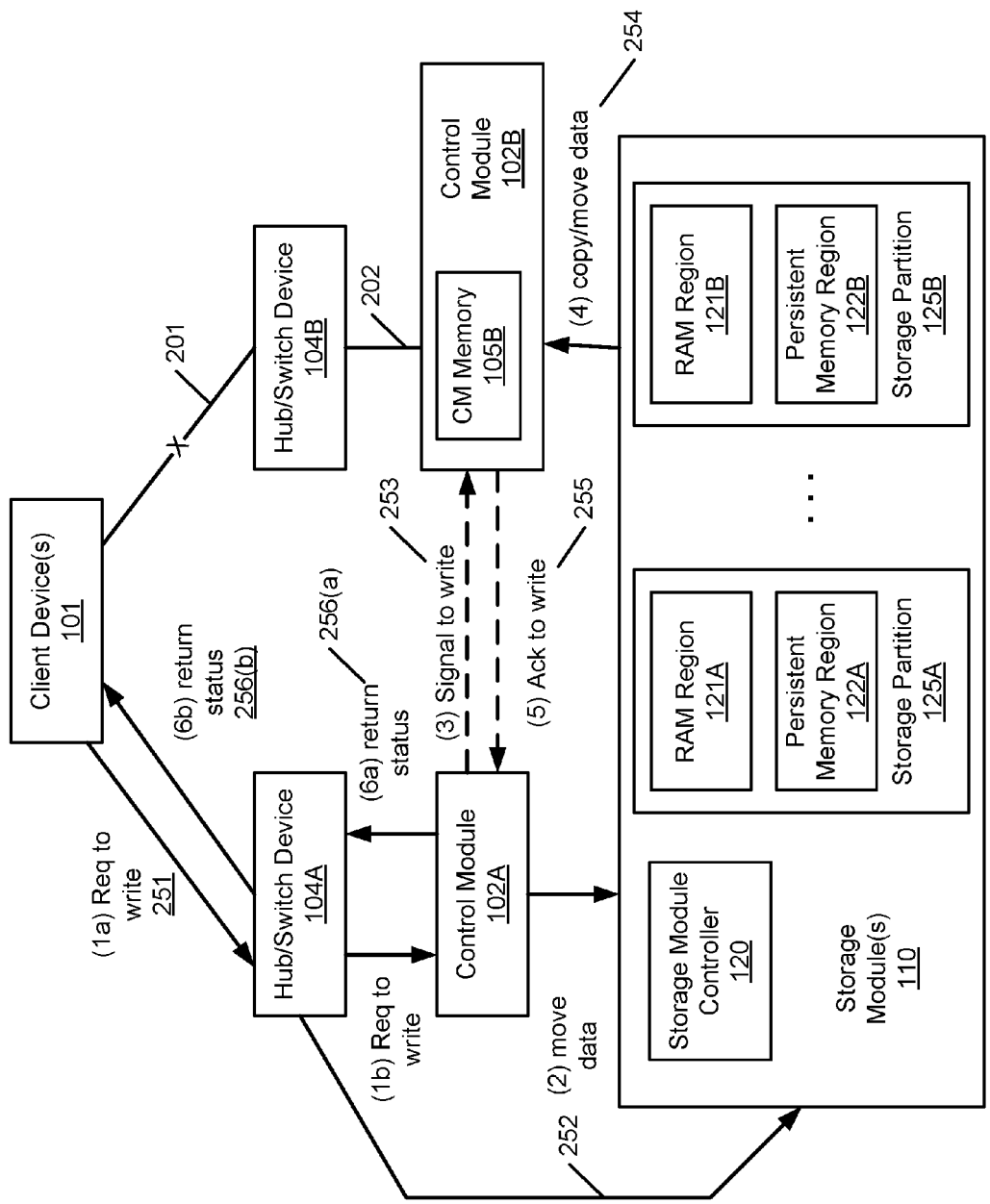
FIG. 2B is a block diagram illustrating a write process of a storage system according to one embodiment of the invention.

FIG. 2B is a block diagram illustrating a read process of a storage system according to one embodiment of the invention. Referring to FIG. 2B, system 200 may be implemented as part of system 100 of FIG. 1. In one embodiment, it is assumed the path from client 101 to CM 102B is down, which may be any of connections 201-202 or the connection between hub/switch device 104B and storage module 110 (e.g., path 203 of FIG. 2A). In this example, client 101 transmits a write request via path 251 (which is part of the communication fabric) to CM 102A via optional hub/switch device 104A. The write request is to write data to a storage location or region of a persistent storage device of storage module 110, in this example, storage device 122B, where the targeted storage region is associated with CM 102B. In response to the write request, the data to be written is transmitted via path 252. For example, the data may be transmitted via a data transaction, such as a DMA transaction, from a client memory of client device 101 to a memory location of RAM region 121A. The data transaction may be initiated by a DMA engine within client 101, hub/switch device 104A, CM 102A, or storage module controller 120.

Once the data has been stored in memory region 121A, CM 102A transmits a control signal to CM 102B via path 253 over an inter-processor link. The control signal may include information indicating a storage location of memory region 121A that stores the data, the size of the data, and a target storage location of persistent storage region 122B. In response to the control signal, CM 102B copies or moves the data from memory region 121A to memory 121B. CM 102B may communicate with storage module controller 120 to copy or move the data from memory region 121A to memory region 121B. The data is then stored from memory region 121B to the target storage location of persistent storage region 122B. In addition, CM 102B may upload the data into its local memory 105B via path 254 for other operations, such as a parity calculation.

CM 102B then transmits a response or acknowledgment to CM 102A via path 255 over the inter-processor link to acknowledge the signal to write. CM 102A then returns the status of the write operation back to client 101 via path 256. Alternatively, according to one embodiment, once the data has been transmitted from the client memory of client 101 to memory region 121A, CM 102A can return the status or acknowledge the write operation to client 101 without having to wait for CM 102B to copy the data from memory region 121A to the target storage location of persistent storage region 122B. Thus, since CMs 102A-102B are coupled to storage module 110 via a communication fabric, storage module 110 can be utilized as a transport layer to transport data as a data path, while the inter-processor link is utilized as a control path to exchange control signals.

According to a further embodiment, as described above, any of storage partitions 125A-125B may be configured to be accessible by any of CMs 102A-102B. CMs 102A-102B may further control and/or manage storage resources of storage module 110 without involving storage module controller 120. In such a configuration, in response to a write request, CM 102A can store or cause the requested data to be stored in memory region 121A or memory region 121B. CM 102A then transmits a control signal to CM 102B via inter-processor link 106, where the control signal identifies where the requested data is stored. CM 102B can then retrieve the requested data from memory region 121A or memory region 121B based on the control signal and store the requested data in a target storage location of persistent memory region 122B. Such a configuration can eliminate the need of copying data between memory region 121A and memory region 121B.

Figure 3:
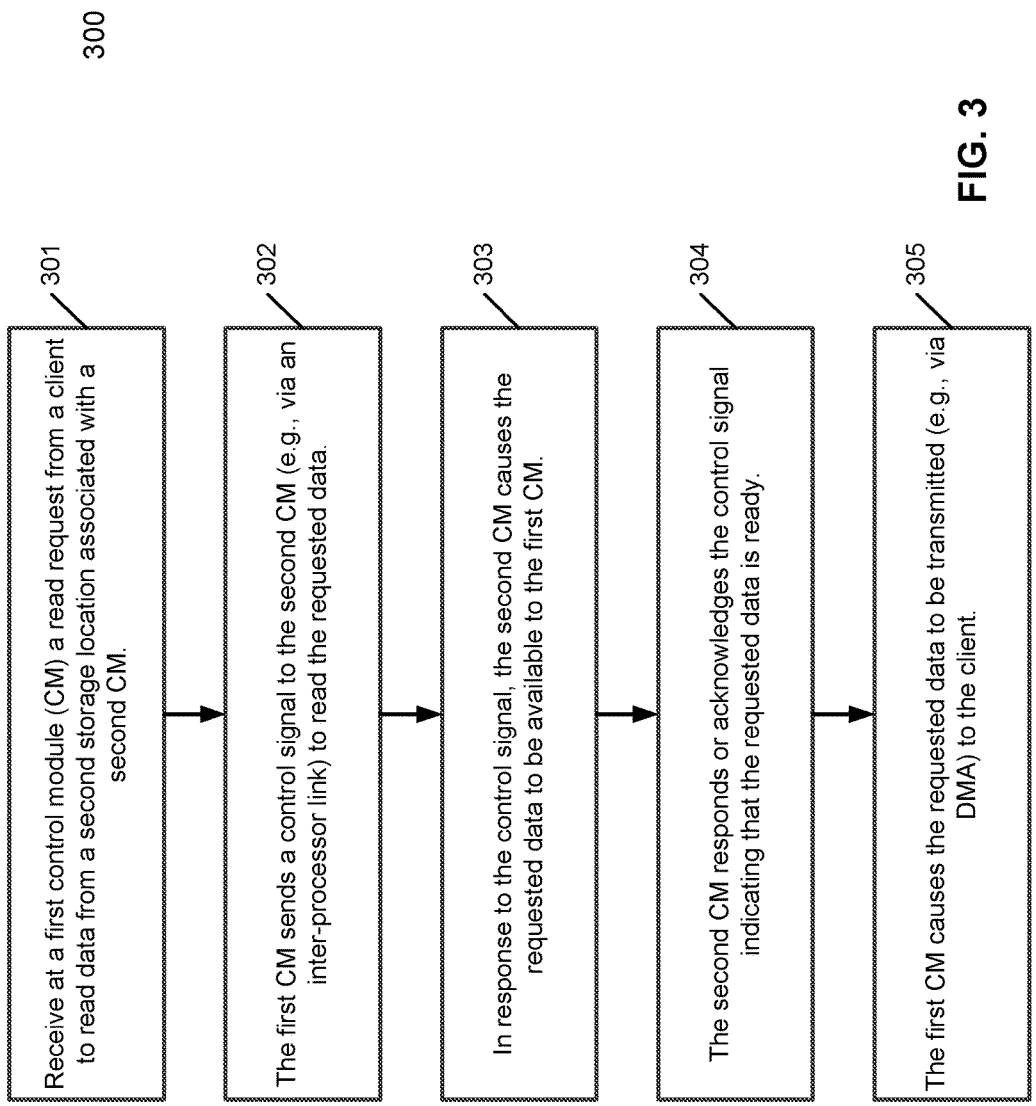
FIG. 3 is a flow diagram illustrating a process of reading data in a storage system according to one embodiment of the invention.

FIG. 3 is a flow diagram illustrating a process of reading data in a storage system according to one embodiment of the invention. Process 300 may be performed by processing logic that includes hardware (e.g. circuitry, dedicated logic, etc.), software (e.g., embodied on a non-transitory computer readable medium), or a combination thereof. For example, process 300 may be performed by system 100 of FIG. 1. Referring to FIG. 3, at block 301, a first CM receives a read request from a client device to read data from a second storage location associated with a second CM. The read request may specify or identify the data and the storage location in which the data is stored. In response to the read request, at block 302, the first CM transmits a control signal to the second CM via an inter-processor link to request reading the requested data. In response to the control signal, at block 303, the second CM causes the requested data to be available to the first CM. In one embodiment, the second CM causes the requested data to be copied or moved from the second storage location to a first memory location associated with the first CM. At block 304, the second CM transmits a response or acknowledgment to the control signal to the first CM over the inter-processor link. At block 305, the first CM causes the requested data to be transmitted (e.g., via DMA) to the client from the first memory location.

Alternatively, any non-persistent resources of a storage partition may be configured to be accessible by any of the first and second CMs. The first and second CMs may further control and/or manage storage resources of storage module 110 without involving a storage module controller. In such a configuration, in response to a read request, the first CM can communicate with the second CM via a control signal over the inter-processor link. In response to the control signal, the second CM can access a storage location in the target storage partition that stores the requested data to cause the requested data to be available in a first memory region associated with the first CM or a second memory region associated with the second CM. The first CM can then initiate a data transaction to move the data from the first memory region or the second memory region to the client memory of the client. Such a configuration can eliminate the need for copying data between the second memory region and the first memory region.

Figure 4:
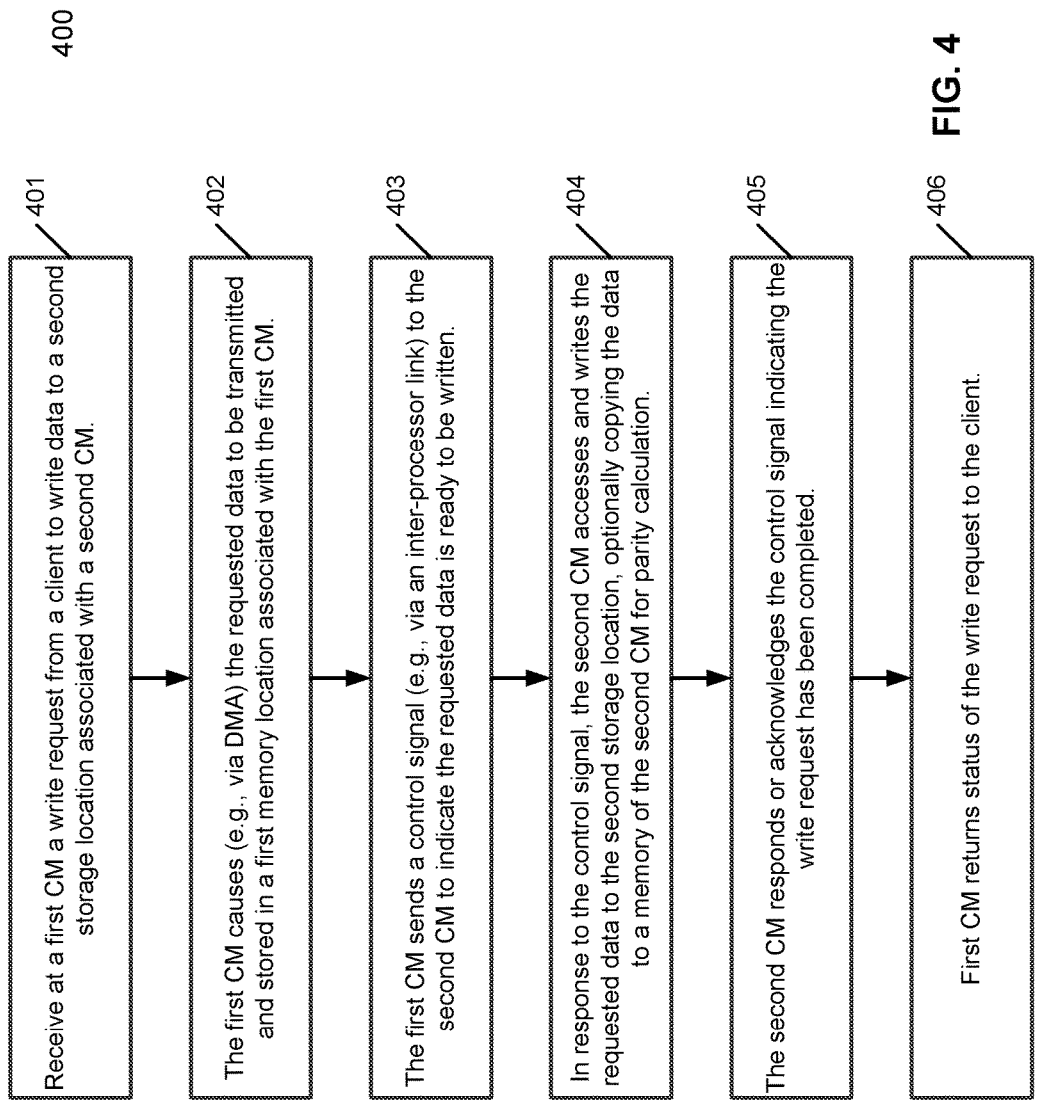
FIG. 4 is a flow diagram illustrating a process of writing data in a storage system according to one embodiment of the invention.

FIG. 4 is a flow diagram illustrating a process of writing data in a storage system according to one embodiment of the invention. Process 400 may be performed by processing logic that includes hardware (e.g. circuitry, dedicated logic, etc.), software (e.g., embodied on a non-transitory computer readable medium), or a combination thereof. For example, process 400 may be performed by system 100 of FIG. 1. Referring to FIG. 4, at block 401, a first CM receives a write request from a client to write data to a second storage location of a storage module associated with the second CM. In response to the write request, the first CM causes (e.g., via DMA) the requested data to be transmitted from the client and stored in a first memory location of the storage module associated with the first CM. At block 403, the first CM transmits a control signal to the second CM over an inter-processor link to indicate that the data is ready. In response to the control signal, at block 404, the second CM causes the requested data to be copied or moved from the first memory location to the second storage location of the storage module. At block 405, the second CM transmits a response to the first CM over the inter-processor link to acknowledge that the data has been written. In response to the response, at block 406, the first CM returns a status back to the client.

According to a further embodiment, as described above, any of the storage partitions may be configured to be accessible by any of the first and second CMs. In such a configuration, in response to a write request, the first CM can store or cause the requested data to be stored in a first memory region associated with the first CM or a second memory region associated with the second CM. The first CM then transmits a control signal to the second CM via an inter-processor link, where the control signal identifies where the requested data is stored. The second CM can then retrieve the requested data from the first memory region or the second memory region based on the control signal and store the requested data in a target storage location of a persistent memory region associated with the second CM. Such a configuration can eliminate the need of copying data between the first memory region and the second memory region.

Figure 5A:
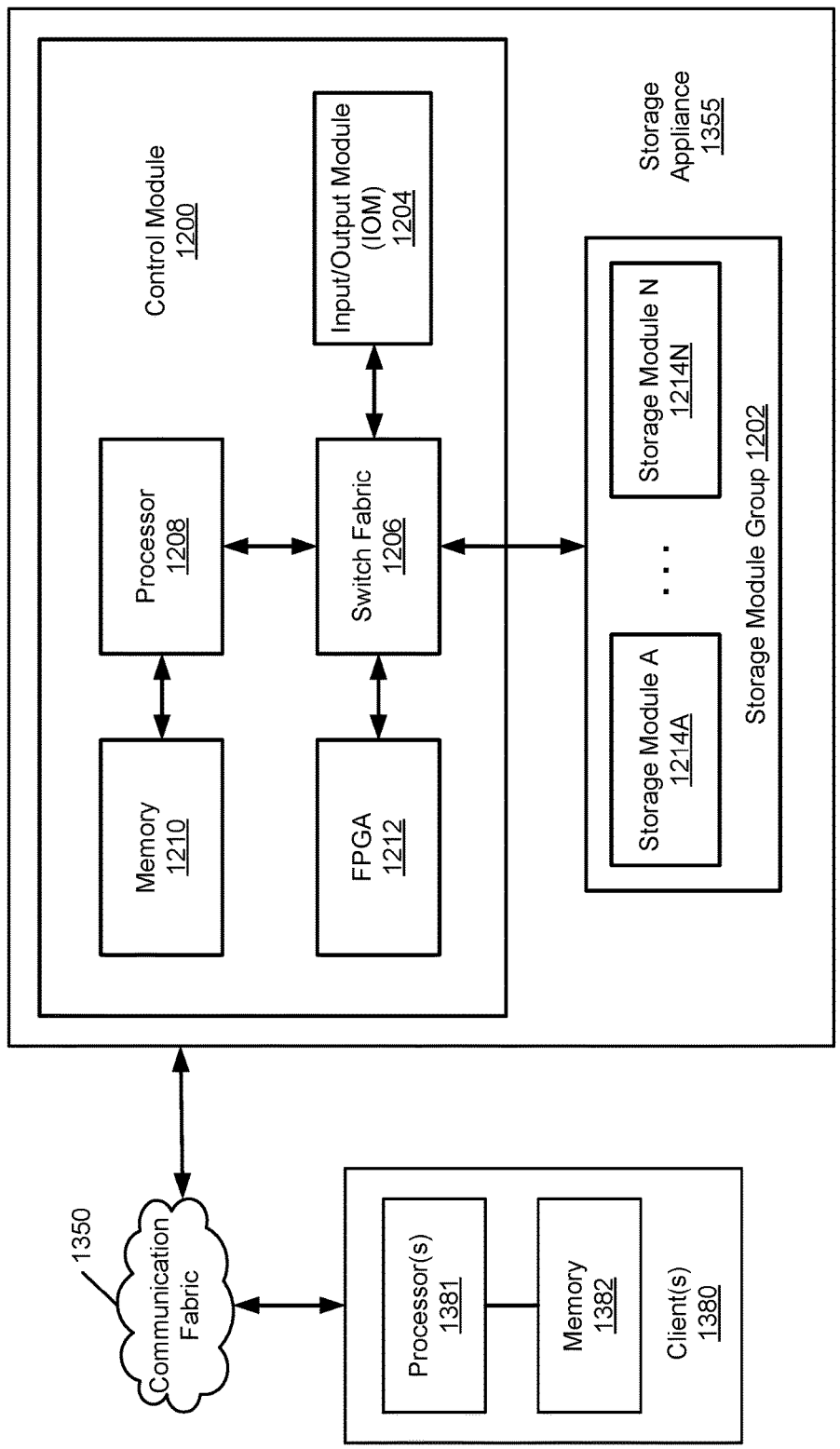
FIGS. 5A-5D are block diagrams illustrating examples of a storage appliance according to certain embodiments of the invention.

FIGS. 5A-5D are block diagrams illustrating examples of a storage appliance according to certain embodiments of the invention. The storage appliance may represent a storage appliance described above. Referring to FIG. 5A, the storage appliance includes a control module 1200 and a storage module group 1202. Control module 1200 may represent any of the control modules described above. In one embodiment, control module 1200 is configured to manage the servicing of read and write requests from one or more clients or client devices 1380. A client herein may represent any of the clients or client devices described above. In one embodiment, control module 1200 is configured to receive requests from one or more clients 1380 via a communication fabric 1350, to process the requests (which may include sending the requests to a storage module), and to provide a response to client 1380 after the request has been serviced.

In one embodiment, control module 1200 includes an Input/Output Module (TOM) 1204, a switch fabric 1206, a processor 1208, a memory 1210, and, optionally, a Field Programmable Gate Array (FPGA) 1212. In one embodiment, TOM 1204 is the physical interface between the clients and the other components in the storage appliance. The TOM 1204 supports a variety of communication protocols, such as, for example, PCI, PCIe, PCI-X, Ethernet (including, but not limited to, the various standards defined under the IEEE 802.3a-802.3bj), Infiniband, and Remote Direct Memory Access (RDMA) over Converged Ethernet (RoCE).

In one embodiment, switch fabric 1206 includes one or more interconnected switches. If switch fabric 1206 includes multiple switches, each switch may be connected to every other switch, may be connected to a subset of switches in the switch fabric, or may only be connected to one other switch in the switch fabric. In one embodiment, each of the switches in switch fabric 1206 is a combination of hardware and logic (implemented, for example, using integrated circuits) (as defined by the protocol(s) the switch fabric implements) that is configured to connect various components together in the storage appliance and to route packets (using the logic) between the various connected components. In one embodiment, switch fabric 1206 is physically connected to TOM 1204, processor 1208, storage module group 1202, and, if present, FPGA 1212. In one embodiment, all inter-component communication in control module 1200 (except between the processor 1208 and memory 1210) passes through switch fabric 1206. Further, all communication between control module 1200 and storage module group 1202 passes through the switch fabric 1206. In one embodiment, switch fabric 1206 is implemented using a PCI protocol (e.g., PCI, PCIe, PCI-X, or another PCI protocol). In such embodiments, all communication that passes through switch fabric 1206 uses the corresponding PCI protocol.

In one embodiment, if switch fabric 1206 implements a PCI protocol, switch fabric 1206 includes a port for the processor (or, more specifically, a port for the root complex integrated in processor 1208 or for the root complex connected to the processor), one or more ports for storage modules 1214A to 1214N in storage module group 1202, a port for the FPGA 1212 (if present), and a port for IOM 1204. Each of storage modules 1214A-1214N may represent any of the storage modules described above. In one embodiment, each of the aforementioned ports may be configured as a transparent bridge or a non-transparent bridge. Those skilled in the art will appreciate that while switch fabric 1206 has been described with respect to a PCI implementation, switch fabric 1206 may be implemented using other protocols without departing from embodiments of the invention.

In one embodiment, at least one switch in switch fabric 1206 is configured to implement multicasting. More specifically, in one embodiment, processor 1208 is configured to generate a multicast group where the multicast group includes two or more members with each member specifying an address in memory 1210 and/or in storage modules 1214A-1214N. When the multicast group is created, the multicast group is associated with a multicast address. In order to implement the multicasting, at least one switch in the switch fabric is configured that when a write specifying the multicast address as the destination address is received, the switch is configured to generate a new write for each member in the multicast group and issue the writes to the appropriate address in the storage appliance. In one embodiment, the address for each write generated by the switch is determined by adding a particular offset to the multicast address.

Processor 1208 may be a group of electronic circuits with a single core or multiple cores that are configured to execute instructions. In one embodiment, processor 1208 may be implemented using a Complex Instruction Set (CISC) Architecture or a Reduced Instruction Set (RISC) Architecture. In one embodiment, processor 1208 includes a root complex (as defined by the PCIe protocol). In one embodiment, if control module 1200 includes a root complex (which may be integrated into processor 1208) then memory 1210 is coupled to processor 1208 via the root complex. Alternatively, memory 1210 is directly connected to processor 1208 using a point-to-point connection mechanism. In one embodiment, memory 1210 may be any volatile memory including, but not limited to, Dynamic Random-Access Memory (DRAM), Synchronous DRAM, SDR SDRAM, and DDR SDRAM.

In one embodiment, processor 1208 is configured to create and update an in-memory data structure (not shown), where the in-memory data structure is stored in memory 1210. In one embodiment, the in-memory data structure includes mappings (direct or indirect) between logical addresses and physical storage addresses in the set of storage modules. In one embodiment, the logical address is an address at which the data appears to reside from the perspective of the client. In one embodiment, the logical address is (or includes) a hash value generated by applying a hash function (e.g. SHA-1, MD-5, etc.) to an n-tuple. In one embodiment, the n-tuple is <object ID, offset ID>, where the object ID defines a file and the offset ID defines a location relative to the starting address of the file. In another embodiment of the technology, the n-tuple is <object ID, offset ID, birth time>, where the birth time corresponds to the time when the file (identified using the object ID) was created. Alternatively, the logical address may include a logical object ID and a logical byte address, or a logical object ID and a logical address offset. In another embodiment of the technology, the logical address includes an object ID and an offset ID. Those skilled in the art will appreciate that multiple logical addresses may be mapped to a single physical address and that the logical address is not limited to the above embodiments.

In one embodiment, the physical address may correspond to (i) a location in memory 1210, (ii) a location in the vaulted memory, or (iii) a location in a solid state memory module. In one embodiment, the in-memory data structure may map a single hash value to multiple physical addresses if there are multiple copies of the data in the storage appliance.

In one embodiment, memory 1210 includes one or more of the following: a submission queue for processor 1208, a completion queue for processor 1208, a submission queue for each of the storage modules 1214A-1214N in the storage appliance, and a completion queue for each of storage modules 1214A-1214N in the storage appliance. In one embodiment, the submission queue for processor 1208 is used to send commands (e.g., read request, write request) to processor 1208. In one embodiment, the completion queue for processor 1208 is used to signal processor 1208 that a command it issued to another entity has been completed. The submission and completion queues for the storage modules function in a similar manner.

In one embodiment, processor 1208 (via the switch fabric) is configured to offload various types of processing to FPGA 1212. In one embodiment, FPGA 1212 includes functionality to calculate checksums for data that is being written to the storage module(s) and/or data that is being read from the storage module(s). Further, FPGA 1212 may include functionality to calculate P and/or Q parity information for purposes of storing data in the storage module(s) using a RAID scheme (e.g., RAID 2-RAID 6) and/or functionality to perform various calculations necessary to recover corrupted data stored using a RAID scheme (e.g., RAID 2-RAID 6). In one embodiment, storage module group 1202 includes one or more storage modules (1214A-1214N) each configured to store data.

In one embodiment, processor 1208 is configured to program one or more DMA engines in the system. For example, processor 1208 is configured to program the DMA engine in the client switch. Processor 1208 may also be configured to program the DMA engine in the storage module. In one embodiment, programming a DMA engine in the client switch may include creating a multicast group and generating descriptors for each of the members in the multicast group.

In one embodiment, communication fabric 1350 can be any of high speed communication fabrics, such as, for example, a PCIe, Ethernet, Fiber channel, or Infiniband™ fabric. Client 1380 may be any system that includes functionality to issue a read request to a storage appliance and/or issue a write request to the storage appliance. Client 1380 may include a client processor 1381 and client memory 1382. In one embodiment client 1380 is configured to communicate with storage appliance 1355 using a variety of communication protocols, such as, Peripheral Component Interconnect (PCI), PCI-Express (PCIe), PCI-eXtended (PCI-X), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric.

In one embodiment, if client 1380 implements PCI, PCI-express, or NVMe, client 1380 may include a root complex (not shown). A root complex is a device that connects client 1380 (including its client processor and client memory) to the PCIe Fabric. In one embodiment, the PCIe Fabric includes root complexes and endpoints which are connected via switches. An endpoint is a device other than a root complex or a switch that can originate PCI transactions (e.g., read request, write request) or that is a target of PCI transactions. One or more clients and one or more storage appliances may be integrated as part of a PCIe fabric. Further, if the individual components within the storage appliance communicate using PCIe and individual components in client 1380 communicate using PCIe, then all the components in the storage appliance and client 1380 may be considered part of a single PCIe Fabric.

The client memory 1382 may include a submission queue (SQ) for the client processor and a completion queue (CQ) for the client processor. In one embodiment of the invention, the storage appliance memory, such as memory devices 1210 include one or more submission queues for client processors visible to a client through the communication fabric. The client memory 1382 includes one or more completion queues for the client processor visible to the storage appliance through the communication fabric. The submission queue for the client processor is used to send commands (e.g., read request, write request) to the client processor. The completion queue for the client processor is used to signal the client processor that a command it issued to another entity has been completed.

Client 1380 may further include a client switch to couple client 1380 to the communication fabric, where the client switch may include one or more switch devices. If the client switch includes multiple switches, each switch may be connected to every other switch, may be connected to a subset of the switches in the switch fabric, or may only be connected to one other switch. In one embodiment of the invention, each of the switches in the client switch is a combination of hardware and logic configured to permit data and messages to be transferred between the client 1380 and the storage appliances 1355.

In such embodiments, a client switch may include one or more ports, where each port may be configured as a transparent bridge or a non-transparent bridge. Ports implemented as transparent bridges allow the root complex to continue discovery of devices (which may be other root complexes, switches, PCI bridges, or endpoints) connected (directly or indirectly) to the port. In contrast, when a root complex encounters a port implemented as a non-transparent bridge, the root complex is not able to continue discovery of devices connected to the port—rather, the root complex treats such a port as an endpoint.

When a port is implemented as a non-transparent bridge, devices on either side of the non-transparent bridge may only communicate using a mailbox system and doorbell interrupts (implemented by the client switch). The doorbell interrupts allow a processor on one side of the non-transparent bridge to issue an interrupt to a processor on the other side of the non-transparent bridge. Further, the mailbox system includes one or more registers that are readable and writeable by processors on either side of the switch fabric. The aforementioned registers enable processors on either side of the client switch to pass control and status information across the non-transparent bridge.

In order to send a PCI transaction from a device on one side of the non-transparent bridge to a device on the other side of the non-transparent bridge, the PCI transaction must be addressed to the port implementing the non-transparent bridge. Upon receipt of the PCI transaction, the client switch performs an address translation (either using a direct address translation mechanism or a look-up table based translation mechanism). The resulting address is then used to route the packet towards the appropriate device on the other side of the non-transparent bridge.

The client switch is configured such that at least a portion of the client memory is directly accessible to the storage appliance. That is, a storage appliance on one side of the client switch may directly access, via the client switch, client memory on the other side of the client switch. The client switch may include a DMA engine programmed by either the client processor or a storage appliance connected to the client switch. The DMA engine may be programmed to read data from an address in the portion of the client memory that is accessible to the storage appliance and directly write a copy of such data to memory in the storage appliance or storage modules. Further, the DMA engine may be programmed to read data from the storage appliance and directly write a copy of such data to an address in the portion of the client memory that is accessible to the storage appliance.

In one embodiment of the invention, the DMA engine supports multicasting. In such embodiments, a processor in the storage appliance may create a multicast group, where each member of the multicast group corresponds to a unique destination address in memory on the storage appliance. Each member of the multicast group is associated with a descriptor that specifies: (i) the destination address; (ii) the source address; (iii) the transfer size field; and (iv) a control field. The source address for each of the descriptors remains constant while the destination address changes for each descriptor. Once the multicast group is created, any data transfer through the switch targeting the multicast group address, including a transfer initiated by a DMA engine, places an identical copy of the data in all of the destination ports associated with the multicast group. The switch processes all of the multicast group descriptors in parallel.

Figure 5B:
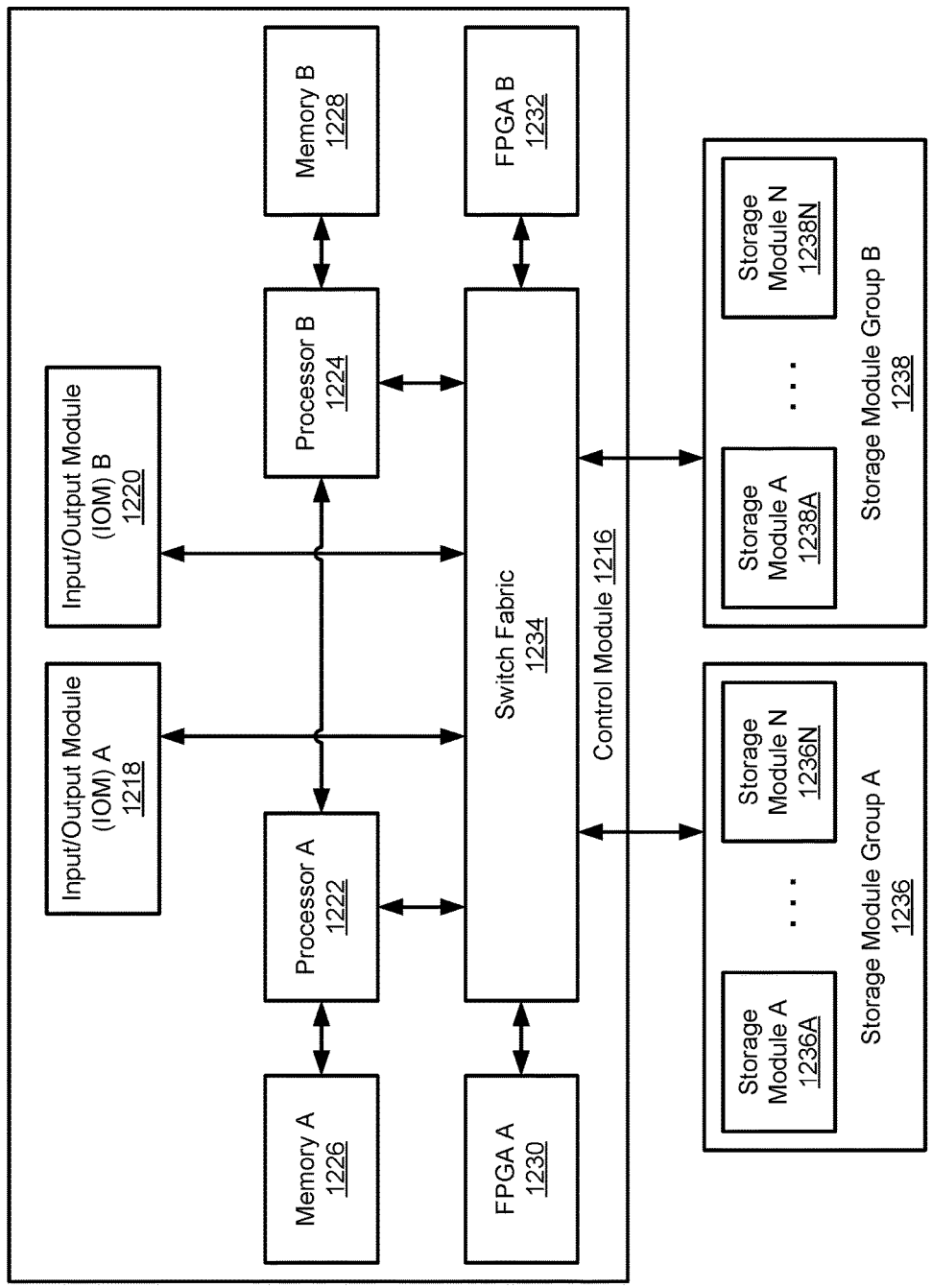

Referring now to FIG. 5B, according to another embodiment, a storage appliance includes a control module 1216 and at least two storage module groups 1236 and 1238. Control module 1216 includes a switch fabric 1234, which is directly connected to TOM A 1218, TOM B 1220, processor A 1222, processor B 1224, (if present) FPGA A 1230, (if present) FPGA B 1232, storage modules 1236A-1236N in storage module group A 1236 and storage modules 1238A-1238N in storage module group B 1238. All communication between the aforementioned components (except between processor A 1222 and processor B 1224) passes through switch fabric 1234. In one embodiment of the technology, processors 1222 and 1224 within control module 1216 are able to directly communicate using, for example, point-to-point interconnect such as Intel® QuickPath Interconnect.

In one embodiment, the two IOMs 1218 and 1220 in control module 1216 double the I/O bandwidth for control module 1216 (over the I/O bandwidth of a control module with a single IOM). Moreover, the addition of a second IOM (or additional IOMs) increases the number of clients that may be connected to a given control module and, by extension, the number of clients that can be connected to a storage appliance. In one embodiment, the use of switch fabric 1234 to handle communication between the various connected components (described above) allows each of processors 1222 and 1224 to directly access (via the switch fabric 1234) all FPGAs 1230 and 1232 and all storage modules (1236A-1236N, 1238A-1238N connected to switch fabric 1234.

Figure 5C:
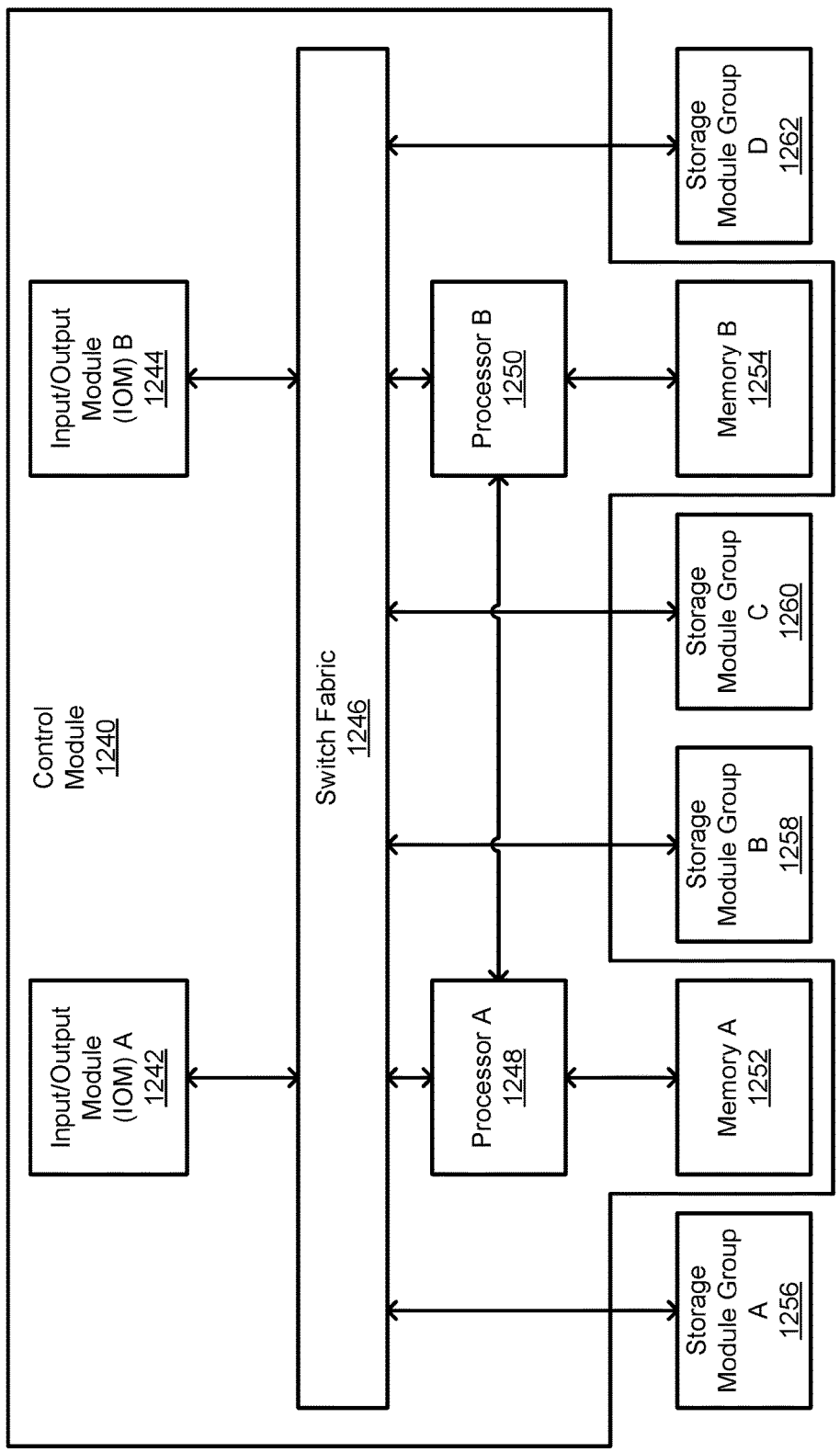

Referring to FIG. 5C, according to another embodiment, a storage appliance includes a control module 1240 connected (via a switch fabric 1246) to multiple storage modules (not shown) in the storage module groups (1256, 1258, 1260, 1262). Control module 1240 includes two IOMs (1242, 1244), two processors (1248, 1250), and memory (1252, 1254). In one embodiment, all components in control module 1240 communicate via switch fabric 1246. The operations of these components are similar to the operations described above.

In one embodiment, processor A 1248 is configured to primarily handle requests related to the storage and retrieval of data from storage module groups A and B (1256, 1258) while processor B 1250 is configured to primarily handle requests related to the storage and retrieval of data from storage module groups C and D (1260, 1262). However, the processors (1248, 1250) are configured to communicate (via the switch fabric 1246) with all of the storage module groups (1256, 1258, 1260, 1262). This configuration enables control module 1240 to spread the processing of I/O requests between the processors and/or provides built-in redundancy to handle the scenario in which one of the processors fails.

Figure 5D:
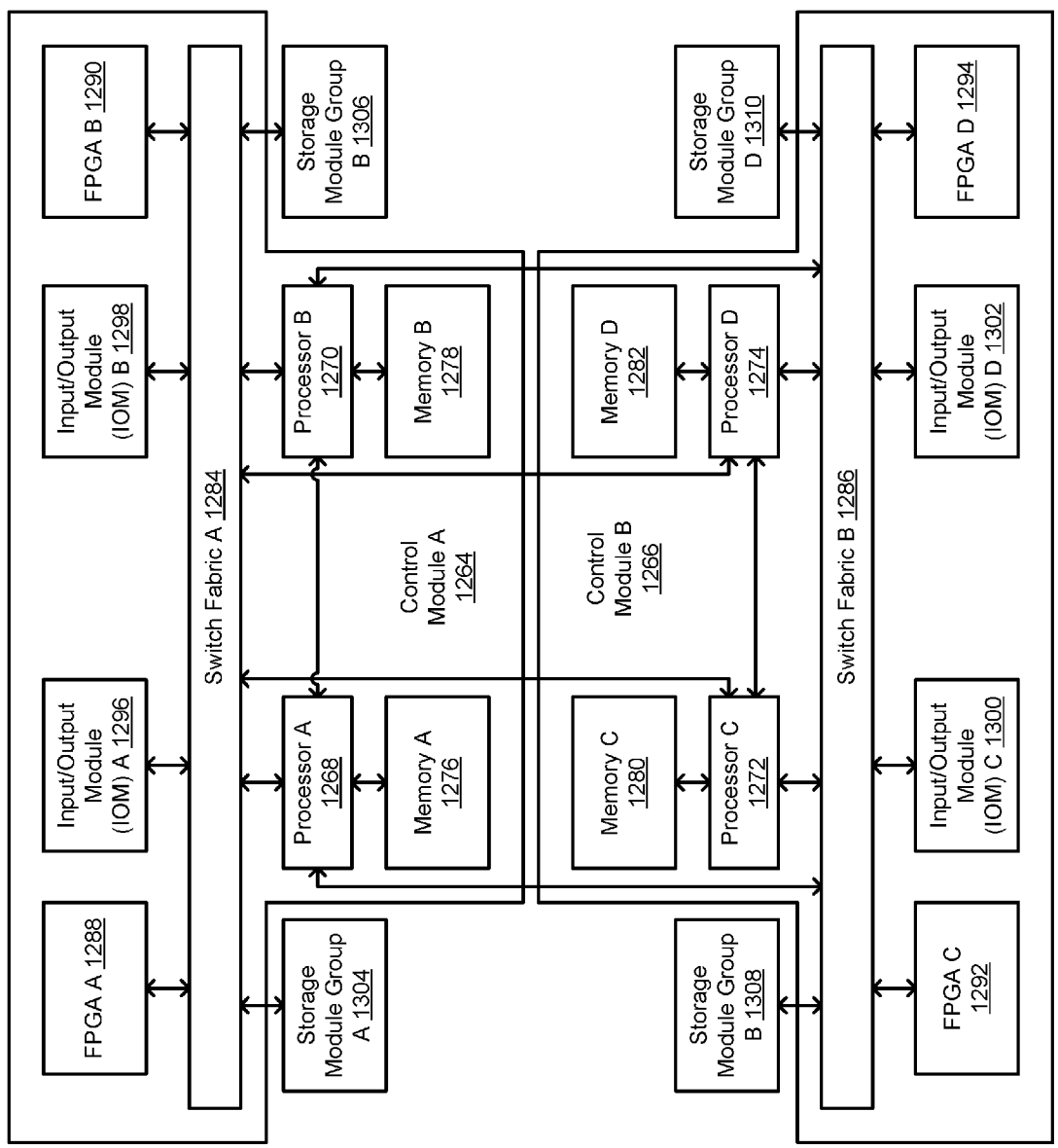

Referring to FIG. 5D, according to another embodiment, a storage appliance includes two control modules (1264, 1266). Each control module includes IOMs (1296, 1298, 1300, 1302), processors (1268, 1270, 1272, 1274), memory (1276, 1278, 1280, 1282), and FPGAs (if present) (1288, 1290, 1292, 1294). Each of the control modules (1264, 1266) includes a switch fabric (1284, 1286) through which components within the control modules communicate.

In one embodiment, processors (1268, 1270, 1272, 1274) within a control module may directly communicate with each other using, for example, a point-to-point interconnect such as Intel® QuickPath Interconnect. In addition, processors (1268, 1270) in control module A may communicate with components in control module B via a direct connection to the switch fabric (1286) in control module B. Similarly, processors (1272, 1274) in control module B may communicate with components in control module A via a direct connection to the switch fabric (1284) in control module A.

In one embodiment, each of the control modules is connected to various storage modules (denoted by storage module groups (1304, 1306, 1308, 1310)). Each control module may communicate with storage modules connected to the switch fabric in the control module. Further, processors in control module A (1264) may communicate with storage modules connected to control module B (266) using switch fabric B (1286). Similarly, processors in control module B (1266) may communicate with storage modules connected to control module A (1264) using switch fabric A (1284).

The interconnection between the control modules allows the storage control to distribute I/O load across the storage appliance regardless of which control module receives the I/O request. Further, the interconnection of control modules enables the storage appliance to process a larger number of I/O requests. Moreover, the interconnection of control modules provides built-in redundancy in the event that a control module (or one or more components therein) fails.

In one embodiment, the in-memory data structure is mirrored across the memories in the control modules. In such cases, the processors in the control modules issue the necessary commands to update all memories within the storage appliance such that the in-memory data structure is mirrored across all the memories. In this manner, any processor may use its own memory to determine the location of a data (as defined by an n-tuple, discussed above) in the storage appliance. This functionality allows any processor to service any I/O request in regards to the location of the data within the storage module. Further, by mirroring the in-memory data structures, the storage appliance may continue to operate when one of the memories fails.

According to some embodiments, some of the components described above, such as control module(s) and/or storage module(s) may be integrated within a communication fabric, such as a PCIe fabric.

Figure 6:
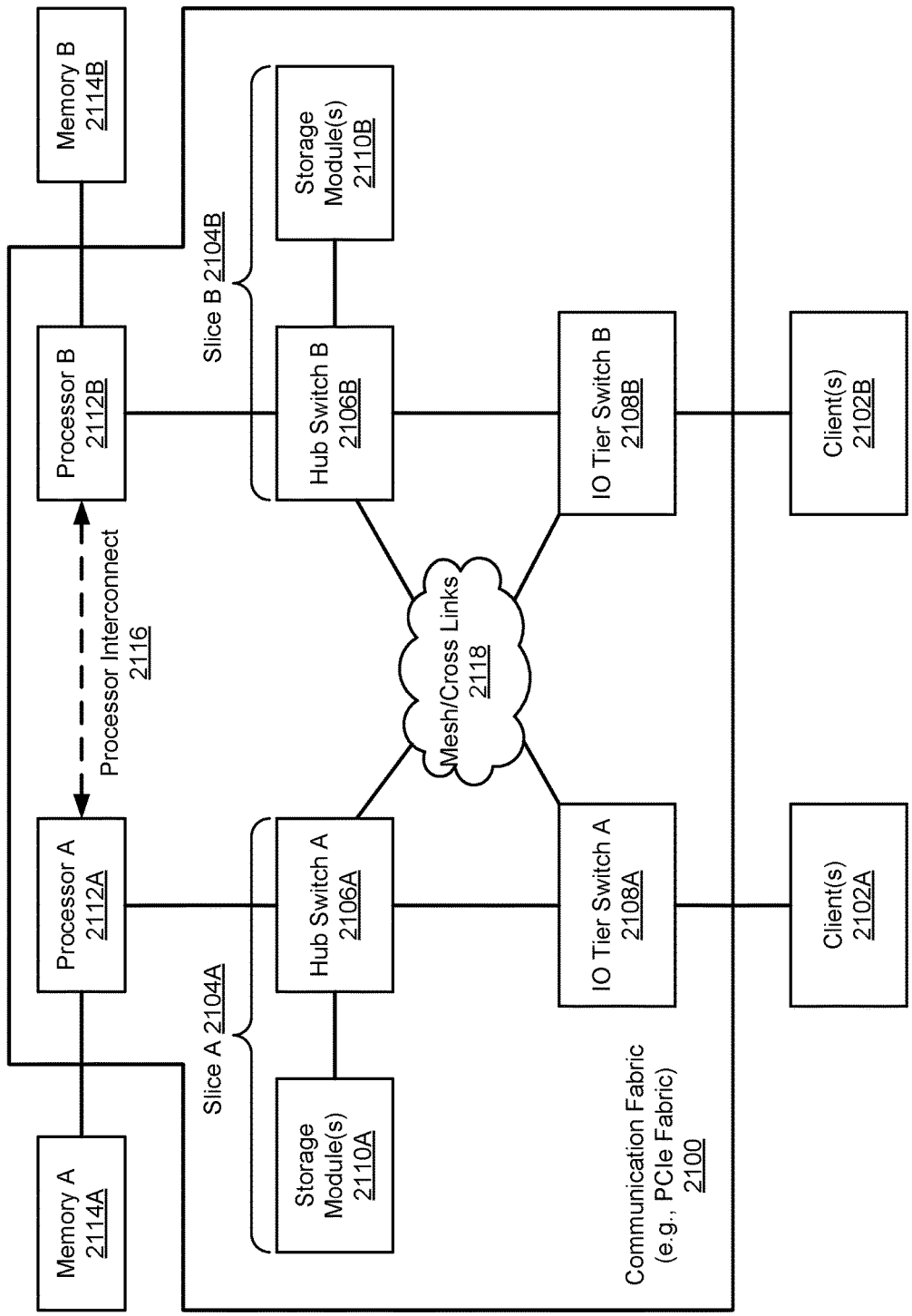
FIG. 6 is a block diagram illustrating an example of a communication fabric according to one embodiment of the invention.

FIG. 6 is a block diagram illustrating a system having a communication fabric according to one embodiment of the invention. In this example, a PCIe fabric is utilized as an example of a communication fabric for the purpose of illustration. However, it will be appreciated that other types of communication fabrics can also be applied. In one embodiment, PCIe Fabric (2100) is made up of two or more slices (2104A, 2104B), where each of the slices is coupled to a processor (2112A, 2112B) and one or more clients (2102A-2102B). Clients 2102A-2102B may represent any of the clients described above.

In one embodiment, each client (2102A-2102B) is a physical device that includes a processor (or another type of processing component), memory, and a physical interface(s) to enable it to connect to the PCIe fabric (2100). Further, each client includes functionality to implement the PCIe standard (or portions thereof) that are required to implement one or more embodiments of the invention. The clients 2102A-2102B also include functionality to send and/or receive transaction layer packets (TLP). A TLP corresponds to a type of packet that is defined in accordance with the PCIe standard. In one embodiment of the invention, the TLPs enable clients to read data from the PCIe fabric and write data to the PCIe fabric. Said another way, the TLPs enable clients to transfer data to and from locations in the PCIe fabric. In one embodiment of the invention, one or more of the clients operates as a PCIe endpoint, i.e., a device that originates a transaction and/or a device that is the target of the transaction. Each of the clients may be connected to PCIe fabric via a link, i.e., physical connection between the client and the PCIe fabric.

Each slice (2104A, 2104B) includes an Input/Output (IO) tier switch (ITS) (2108A, 2108B), a hub tier switch (HTS) (2106A, 2106B), and one or more persistent storage modules (PSMs) 2110A-2110B. With respect to the ITS, each ITS is a physical PCIe switch that is connected to one or more clients (2102A-2102B). Each ITS is also coupled to a HTS in the same slice in which the ITS is located. In addition, each ITS may be coupled to one or more HTSes in different slices than the one in which the ITS is located. In one embodiment of the invention, each ITS is connected to every HTS in the PCI fabric resulting in a fully connected mesh between the tiers in the PCIe fabric. Embodiments of the invention may be implemented without a fully connected mesh between the tiers without departing from the invention.

In one embodiment of the invention, each ITS is configured to: (i) receive TLPs from the clients with which it is connected and route the TLPs to the appropriate egress port (either the upstream port or one of the downstream ports) on the ITS using address routing, such as memory address routing, and (ii) receive TLPs from one or more HTSes to which the ITS is connected and route the TLPs to the appropriate egress port (typically a downstream port) on the ITS using address routing.

Each HTS is a physical PCIe switch that is coupled to one or more ITSes (2108A-2108B) and to one or more persistent storage modules (PSMs) (2110A-2110B). Each HTS is coupled to an ITS in the same slice in which the HTS is located. In addition, each HTS may be connected to zero or more ITSes in different slices than the one in which the HTS is located. In one embodiment of the invention, each HTS is connected to every other ITS in the PCIe fabric resulting in a fully connected mesh between the tiers in the PCIe fabric. Each HTS may also be connected to a processor via its root port (not shown). Embodiments of the invention may be implemented without a fully-connected mesh between the tiers without departing from the invention.

In one embodiment, each HTS is configured to: (i) receive TLPs from the persistent storage modules (PSM) with which it is connected and route the TLPs to the appropriate egress port (typically a downstream port) on the HTS using address routing and (ii) receive TLPs from one or more ITSes to which the HTS is connected and route the TLPs to the appropriate egress port (either the upstream port and/or one or more of the downstream ports) on the HTS using address routing.

In one embodiment, each of the storage modules (2100A-2110B) includes persistent storage (not shown) and, optionally, volatile memory (not shown) (e.g., Dynamic Random-Access Memory (DRAM), Synchronous DRAM, SDR SDRAM, and DDR SDRAM). The persistent storage may include, but is not limited to, NAND Flash memory, NOR Flash memory, Magnetic RAM Memory (M-RAM), Spin Torque Magnetic RAM Memory (ST-MRAM), Phase Change Memory (PCM), memristive memory, any other memory defined as non-volatile Storage Class Memory (SCM), magnetic disks, and optical disks. Those skilled in the art will appreciate that embodiments of the invention are not limited to storage class memory. In one embodiment of the invention, each of the PSMs is part of only one slice.

Each of processors 2112A-2112B may be a group of electronic circuits with a single core that is configured to execute instructions or multiple cores that are configured to execute instructions. The processor may be implemented using a Complex Instruction Set (CISC) Architecture or a Reduced Instruction Set (RISC) Architecture. In one or more embodiments of the invention, the processor includes a root complex (as defined by the PCIe standard) (not shown). The root complex connects the processor to at least one slice and to memory (114A, 114B) (e.g., Dynamic Random-Access Memory (DRAM), Synchronous DRAM, SDR SDRAM, and DDR SDRAM) that is accessible via the PCIe fabric but that is not part of any slice in the PCIe fabric.

In one embodiment, processors (2112A, 2112B) within the PCIe fabric 2100 are able to communicate using, for example, a processor interconnect (2116) such as Intel QuickPath Interconnect, Intel Front Side Bus, or AMD HyperTransport. Those skilled in the art will appreciate that other point-to-point communication mechanisms may be used to permit direct communication between the processors (2112A, 2112B) without departing from embodiments of the invention. While clients are coupled to the ITSes and PSMs coupled to the HTSes, clients may also be coupled to the HTSes and PSMes are connected to the ITSes.

In another embodiment, the PCIe fabric may be implemented such that it does not include any PSMs 2110A-2110B; rather, both the ITSes and the HTSes are connected to separate sets of clients, wherein the PCIe fabric facilitates communication between the clients. Further, while the PCIe fabric shown only includes two slices, two processors, and four PSMs, PCIe fabric 2100 may be implemented with a fewer or greater number of each of the aforementioned components without departing from the invention. In addition, while the PCIe fabric 2100 is connected to four clients and two memories, embodiments of the invention may be implemented to enable the PCIe fabric to connect with a fewer or greater number of clients and/or memories.

Further, while embodiments of the invention have been described with respect to a PCIe fabric that includes storage (e.g., PSM 2110A-2110B), embodiments of the invention may be implemented to enable any two devices to communicate using the PCIe fabric. For example, in one embodiment of the invention, the clients may be blade servers, where the blade servers do not include any physical NIC cards and PSMs may be replaced with network endpoint devices.

In this example, network endpoint devices are devices that are configured to interface with both a network (i.e., a wired network, a wireless network or a combination thereof) using a networking protocol and with the PCIe fabric via PCIe. An example of network endpoint device is a PICe NIC card. The network endpoint devices may each include a combination of persistent storage (as described above with respect to the PSMs), and storage endpoint device memory (e.g., Dynamic Random-Access Memory (DRAM), Synchronous DRAM, SDR SDRAM, DDR SDRAM, or any other type of volatile memory).

In another example, in one or more embodiments of the invention, the PSMs 2110A-2110B may be replaced with storage endpoint devices (i.e., devices that include functionality to store data and service read and write requests from clients). The storage endpoint devices may each include a combination of persistent storage (as described above with respect to the PSMs), and storage endpoint device memory (e.g., Dynamic Random-Access Memory (DRAM), Synchronous DRAM, SDR SDRAM, DDR SDRAM, or any other type of volatile memory). An example of the storage endpoint device is a storage appliance. The invention is not limited to this example.

Further, embodiments of the invention may be extended to cover two or more devices communicating via a PCIe fabric. In the general case, the PSM 2110A-2110B may be generalized to a target device, where the target device may include the PSM, a network endpoint device, a storage endpoint device, or any other device capable of communicating using PCIe. While the PCIe Fabric 2100 has been shown as including the PSMs (or more generally target devices), the PCIe Fabric 2100 may be implemented such that it does not include the target devices; rather, the PCIe Fabric 2100 only include the necessary physical components to connect to the target devices.

Figure 7:
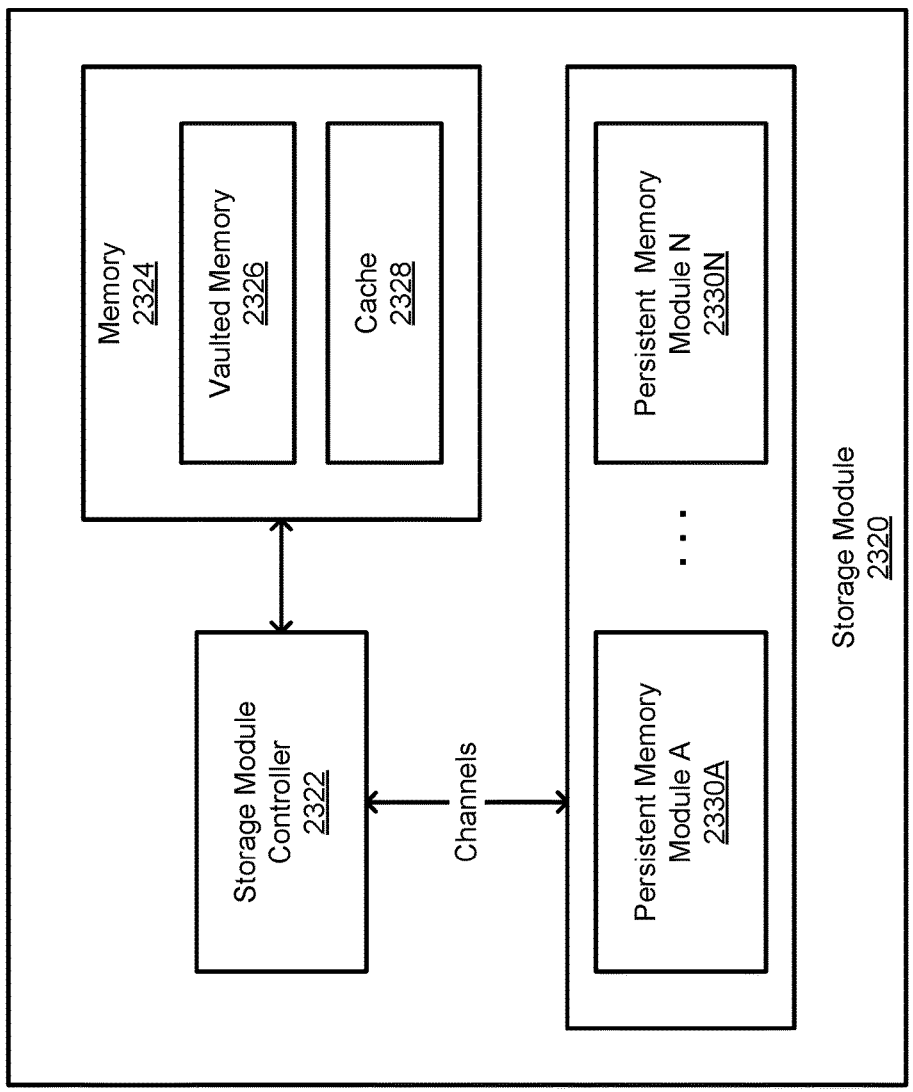
FIG. 7 is a block diagram illustrating an example of a storage module according to one embodiment of the invention.

FIG. 7 is a block diagram illustrating an example of a storage module according to one embodiment of the invention. The storage module 2320 includes a storage module controller (2322), memory (2324), and one or more persistent memory modules (2330A-2330N). Persistent memory modules 2330A-2330N may be solid state memory devices such as flash memory devices. In one embodiment, the storage module controller (2322) is configured to receive requests to read from and/or write data to one or more control modules. Further, the storage module controller (2322) is configured to service the read and write requests using the memory (2324) and/or the persistent memory modules (2330A-2330N). The storage module controller (2322) may include a DMA engine, where the DMA engine is configured to read data from the memory (2324) or from one of the persistent memory modules (2330A-2330N) and write a copy of the data to a physical address in a client memory. Further, the DMA engine may be configured to write data from the memory (2324) to one or more of the persistent memory modules. In one embodiment of the invention, the DMA engine is configured to be programmed by the processor.

The memory (2324) may be any volatile memory including, but not limited to, Dynamic Random-Access Memory (DRAM), Synchronous DRAM, SDR SDRAM, and DDR SDRAM. The memory (2324) may be logically or physically partitioned into vaulted memory (2326) and cache (2328). The storage module controller (2322) is configured to write out the entire contents of the vaulted memory (2326) to one or more of the persistent memory modules (2330A-2330N) in the event of notification of a power failure (or another event in which the storage module may lose power) in the storage module. In one embodiment of the invention, the storage module controller (2322) is configured to write the entire contents of the vaulted memory (2326) to one or more of the persistent memory modules (2330A-2330N) between the time of the notification of the power failure and the actual loss of power to the storage module. In contrast, the content of the cache (2328) is lost in the event of a power failure (or another event in which the storage module may lose power).

The persistent memory modules may be any data storage device that uses solid-state memory to store persistent data. In one embodiment of the invention, solid-state memory may include, but is not limited to, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to storage class memory.

In one embodiment, the following storage locations are part of a unified address space: (i) the portion of the client memory accessible via the client switch, (ii) the memory in the control module, (iii) the memory in the storage modules, and (iv) the solid state memory modules. Accordingly, from the perspective of the processor in the storage appliance, the aforementioned storage locations (while physically separate) appear as a single pool of physical addresses. Said another way, the processor may issue read and/or write requests for data stored at any of the physical addresses in the unified address space. The aforementioned storage locations may be referred to as storage fabric that is accessible using the unified address space. A unified address space is created, in part, by the non-transparent bridge in the client switch which allows the processor in the control module to "see" a portion of the client memory. Accordingly, the processor in the control module may perform read and/or write requests in the portion of the client memory that it can "see."

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A storage system, comprising:
   a communication fabric;
   a client device connected to the communication fabric;
   a first control module (CM) connected to the client device via the communication fabric;
   a second CM connected to the client device via the communication fabric, wherein the first CM and the second CM are connected to each other via an inter-processor link; and
   a storage module connected to the communication fabric, wherein the first CM is adapted to
     receive a first request from client device to read first data stored in a second storage location of the storage module, the second storage location being associated with a second CM,
     transmit, in response to receiving the first request to read the first data stored in the second storage location, a first control signal to the second CM via the inter-processor link to request the second CM to copy the first data from the second storage location to a first memory location of the storage module, the first memory location being associated with the first CM, and initiate a first data transaction to transmit the first data from the first memory location to the client device through the communication fabric without having to go through the second CM.

2. The storage system of claim 1, wherein in response to the first control signal, the second CM is adapted to
retrieve the first data from the second storage location,
store the first data in the first memory location, and
transmit a second control signal from the second CM to the first CM to indicate that the first data is available at the first memory location, wherein the first CM initiates the first data transaction in response to the second control signal.

3. The storage system of claim 2, wherein the second storage location is within a persistent storage device of the storage module, wherein the first memory location is within a first memory region of a random access memory (RAM) device of the storage module, and wherein the first memory region is associated with the first CM.

4. The storage system of claim 3, wherein the first data is loaded from the second storage location of the persistent storage device into a second memory region of the RAM device, wherein the second memory region is associated with the second CM, and wherein the first data is then copied from the second memory region to the first memory region of the RAM device.

5. The storage system of claim 1, further comprises a direct memory access (DMA) engine, wherein the first data transaction to transmit the first data comprises a DMA transaction from the first memory location to a client memory of the client.

6. The storage system of claim 1, wherein the communication fabric comprises a peripheral component interface express (PCIe) fabric.

7. The storage system of claim 1, wherein the first CM is further adapted to:
receive a second request from the client to write second data to a fourth storage location of the storage module, the fourth storage location associated with the second CM,
in response to the second request, initiate a second data transaction to transmit the second data to a third memory location of the storage module, the third memory location being associated with the first CM, and
copy the second data from the third memory location to the fourth storage location within the storage module.

8. The storage system of claim 7, wherein the first CM transmits a third control signal to the second CM to indicate that the second data has been stored in the third memory location in response to the second data transaction, wherein in response to the third control signal, the second CM causes the second data to be copied from the third memory location to the fourth storage location.

9. The storage system of claim 7, wherein the second data transaction comprises a direct memory access (DMA) transaction to move the second data from a client memory of the client device to the third memory location.

10. A computer-implemented method for accessing data in a storage system, the method comprising:
receiving, at a first control module (CM) of a storage system, a first request from a client device to read first data stored in a second storage location of a storage module, the second storage location being associated with a second CM, wherein the first CM includes a first processor and the second CM includes a second processor;
transmitting, in response to receiving the first request to read the first data stored in the second storage location, a first control signal from the first CM to the second CM via an inter-processor link to request the second CM to copy the first data from the second storage location to a first memory location of the storage module, the first memory location being associated with the first CM; and
initiating by the first CM a first data transaction to transmit the first data from the first memory location to the client device through a communication fabric without having to go through the second CM.

11. The method of claim 10, further comprising:
in response to the first control signal, retrieving the first data by the second CM from the second storage location;
storing the first data in the first memory location; and
transmitting a second control signal from the second CM to the first CM to indicate that the first data is available at the first memory location, wherein the first CM initiates the first data transaction in response to the second control signal.

12. The method of claim 11, wherein the second storage location is within a persistent storage device of the storage module, wherein the first memory location is within a first memory region of a random access memory (RAM) device of the storage module, and wherein the first memory region is associated with the first CM.

13. The method of claim 12, wherein the first data is loaded from the second storage location of the persistent storage device into a second memory region of the RAM device, wherein the second memory region is associated with the second CM, and wherein the first data is then copied from the second memory region to the first memory region of the RAM device.

14. The method of claim 10, wherein the first data transaction to transmit the first data comprises a direct memory access (DMA) transaction from the first memory location to a client memory of the client device.

15. The method of claim 10, wherein the communication fabric comprises a peripheral component interface express (PCIe) fabric.

16. The method of claim 10, further comprising:
receiving at the first CM a second request from the client device to write second data to a fourth storage location of the storage module, the fourth storage location associated with the second CM;
in response to the second request, initiating by the first CM a second data transaction to transmit the second data to a third memory location of the storage module, the third memory location being associated with the first CM; and
copying the second data from the third memory location to the fourth storage location within the storage module.

17. The method of claim 16, further comprising transmitting a third control signal from the first CM to the second CM to indicate that the second data has been stored in the third memory location in response to the second data transaction, wherein in response to the third control signal, the second CM causes the second data to be copied from the third memory location to the fourth storage location.

18. The method of claim 16, wherein the second data transaction comprises a direct memory access (DMA) transaction to move the second data from a client memory of the client device to the third memory location.

19. A non-transitory machine-readable medium having instructions stored therein, which when executed by a machine, cause the machine to perform operations of accessing data in a storage system, the operations comprising:

receiving, at a first control module (CM) of a storage system, a first request from a client device to read first data stored in a second storage location of a storage module, the second storage location being associated with a second CM, wherein the first CM includes a first processor and the second CM includes a second processor;

transmitting, in response to receiving the first request to read the first data stored in the second storage location, a first control signal from the first CM to the second CM via an inter-processor link to request the second CM to copy the first data from the second storage location to a first memory location of the storage module, the first memory location being associated with the first CM; and initiating by the first CM a first data transaction to transmit the first data from the first memory location to the client device through a communication fabric without having to go through the second CM.

20. The non-transitory machine-readable medium of claim 19, wherein the operations further comprise:

in response to the first control signal, retrieving the first data by the second CM from the second storage location;

storing the first data in the first memory location; and transmitting a second control signal from the second CM to the first CM to indicate that the first data is available at the first memory location, wherein the first CM initiates the first data transaction in response to the second control signal.

21. The non-transitory machine-readable medium of claim 20, wherein the second storage location is within a persistent storage device of the storage module, wherein the first memory location is within a first memory region of a random access memory (RAM) device of the storage module, and wherein the first memory region is associated with the first CM.

22. The non-transitory machine-readable medium of claim 21, wherein the first data is loaded from the second storage location of the persistent storage device into a second memory region of the RAM device, wherein the second memory region is associated with the second CM, and wherein the first data is then copied from the second memory region to the first memory region of the RAM device.

23. The non-transitory machine-readable medium of claim 19, wherein the first data transaction to transmit the first data comprises a direct memory access (DMA) transaction from the first memory location to a client memory of the client device.

24. The non-transitory machine-readable medium of claim 19, wherein the communication fabric comprises a peripheral component interface express (PCIe) fabric.

25. The non-transitory machine-readable medium of claim 19, wherein the operations further comprise:

receiving at the first CM a second request from the client device to write second data to a fourth storage location of the storage module, the fourth storage location associated with the second CM;

in response to the second request, initiating by the first CM a second data transaction to transmit the second data to a third memory location of the storage module, the third memory location being associated with the first CM; and copying the second data from the third memory location to the fourth storage location within the storage module.

26. The non-transitory machine-readable medium of claim 25, wherein the operations further comprise transmitting a third control signal from the first CM to the second CM to indicate that the second data has been stored in the third memory location in response to the second data transaction, wherein in response to the third control signal, the second CM causes the second data to be copied from the third memory location to the fourth storage location.

27. The non-transitory machine-readable medium of claim 25, wherein the second data transaction comprises a direct memory access (DMA) transaction to move the second data from a client memory of the client device to the third memory location.

* * * * *